(12) United States Patent
Mahajan

(10) Patent No.: US 8,738,818 B2
(45) Date of Patent: May 27, 2014

(54) APPARATUS AND METHOD FOR ANALYZING BIDIRECTIONAL DATA EXCHANGED BETWEEN TWO ELECTRONIC DEVICES

(75) Inventor: Abhijit Mahajan, Bangalore (IN)

(73) Assignee: LSI Corporation, Milpitas, CA (US)

( * ) Notice: Subject to any disclaimer, the term of this patent is extended or adjusted under 35 U.S.C. 154(b) by 211 days.

(21) Appl. No.: 12/973,906

(22) Filed: Dec. 21, 2010

(65) Prior Publication Data

US 2012/0159007 A1    Jun. 21, 2012

(51) Int. Cl.
*G06F 3/00* (2006.01)
(52) U.S. Cl.
USPC ............................................... 710/15; 710/20
(58) Field of Classification Search
USPC ....................................... 710/15, 20
See application file for complete search history.

(56) References Cited

U.S. PATENT DOCUMENTS

| 6,247,147 | B1 | 6/2001 | Veenstra et al. |
| 7,539,900 | B1 | 5/2009 | Plofsky |
| 2006/0129733 | A1* | 6/2006 | Sobelman ..................... 710/305 |
| 2007/0081553 | A1* | 4/2007 | Cicchetti et al. ............ 370/466 |
| 2009/0168654 | A1* | 7/2009 | Mies et al. .................... 370/241 |

* cited by examiner

*Primary Examiner* — Zachary K Huson
(74) *Attorney, Agent, or Firm* — Prakash Nama; Global IP Services, PLLC

(57) ABSTRACT

An apparatus and method for analyzing bidirectional data exchanged between two electronic devices is disclosed. In one embodiment, received and transmitted data at a first physical layer interface (PHY) is tapped by a second PHY in a first electronic device substantially before the received data is processed in the first electronic device and substantially before the transmitted data is processed by a second electronic device. Further, the tapped received and transmitted data is output to an analyzer for analyzing the received and transmitted data by the second PHY in the first electronic device.

14 Claims, 3 Drawing Sheets

APPARATUS AND METHOD FOR ANALYZING BIDIRECTIONAL DATA EXCHANGED BETWEEN TWO ELECTRONIC DEVICES

FIELD OF TECHNOLOGY

Embodiments of the present subject matter relate to the field of test and measurement techniques. More particularly, embodiments of the present subject matter relate to analyzing bidirectional data exchanged between two electronic devices.

BACKGROUND

Today, usage of high speed point-to-point data links, such as serial and parallel data links, between electronic devices are very common. Exemplary high speed serial data links in storage applications include, peripheral component interconnect express (PCIe), serial attached small computer system interface (SAS), serial advanced technology attachment (SATA), fiber channel (FC) and the like.

Due to the rising data transmission rates, these data links are currently driven at data rates of several gigabits per second. As a result of such high data transmission and receive rates, any type of probing of the data links may lead to adverse effects on signal integrity and may result in problems in reception and transmission of data between the electronic devices.

Typically, an analyzer may be used to test, debug and diagnose any data or protocol sent using such data links. Generally, testing is done by inserting an analyzer between two or more electronic devices by breaking the data links so that the data exchanged between the electronic devices flows in and out of the analyzer. This type of testing, typically, addresses the signal integrity issues, however, this technique is limited by the fact that it requires breaking the data links, which implies that only the physically accessible data links (such as a cable connecting two or more electronic devices) can be broken for analyzing the data exchanged between the electronic devices. Further, the above approach may not be feasible for use in embedded data links, such as data links embedded in inner layers of a printed circuit board (PCB) as there are no cables used in connecting the electronic devices.

Furthermore, the above approach may not be feasible for electronic devices that have physically inaccessible data links. Exemplary inaccessible data links include motherboards having embedded storage processors wherein the PCIe data link directly connects between the northbridge and a controller on the PCB. Another exemplary inaccessible data links is a storage enclosure backplane where connecting a SAS analyzer between a backplane and a drive is nearly inaccessible due to the tight space. Yet another exemplary inaccessible data links is a server backplane where the SAS analyzer is connected between backplane and the drive. Moreover, in the above testing approach, the analyzer needs to have the capability to transmit back the received data and this can be cumbersome and expensive.

SUMMARY

Apparatus and method for analyzing bidirectional data exchanged between two electronic devices is disclosed. According to one aspect of the present subject matter, a method includes tapping received and transmitted data at a first physical layer interface (PHY) by a second PHY in a first electronic device substantially before the received data is processed in the first electronic device and substantially before the transmitted data is processed by a second electronic device. Further, the tapped received and transmitted data is output to an analyzer for analyzing the received and transmitted data by the second PHY in the first electronic device.

According to yet another aspect of the present subject matter, an apparatus for analyzing bidirectional data exchanged between electronic devices, comprising a first electronic device including a first PHY and a second PHY. Further, the second electronic device is coupled to the first electronic device via a data link to the first PHY. Furthermore, the second PHY taps received and transmitted data at a first PHY substantially before the received data is processed in the first electronic device and substantially before the transmitted data is processed by the second electronic device. In addition, the second PHY outputs the tapped received and transmitted data to an analyzer for analyzing the received and transmitted data.

The methods and apparatus disclosed herein may be implemented in any means for achieving various aspects, and other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

Apparatus and method for analyzing bidirectional data exchanged between two electronic devices is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The term "analyzing" as used herein refers to testing, debugging and other such activities associated with analyzing data exchanged between electronic devices.

The term "PHY" as used herein refers to a physical layer interface in an electronic device. Also, the term "PHY" refers to a port in the electronic device. Further, the term "PHY" is used to refer that it connects the electronic devices to a physical medium, such as a copper cable, an optical fiber and the like.

Figure 1:
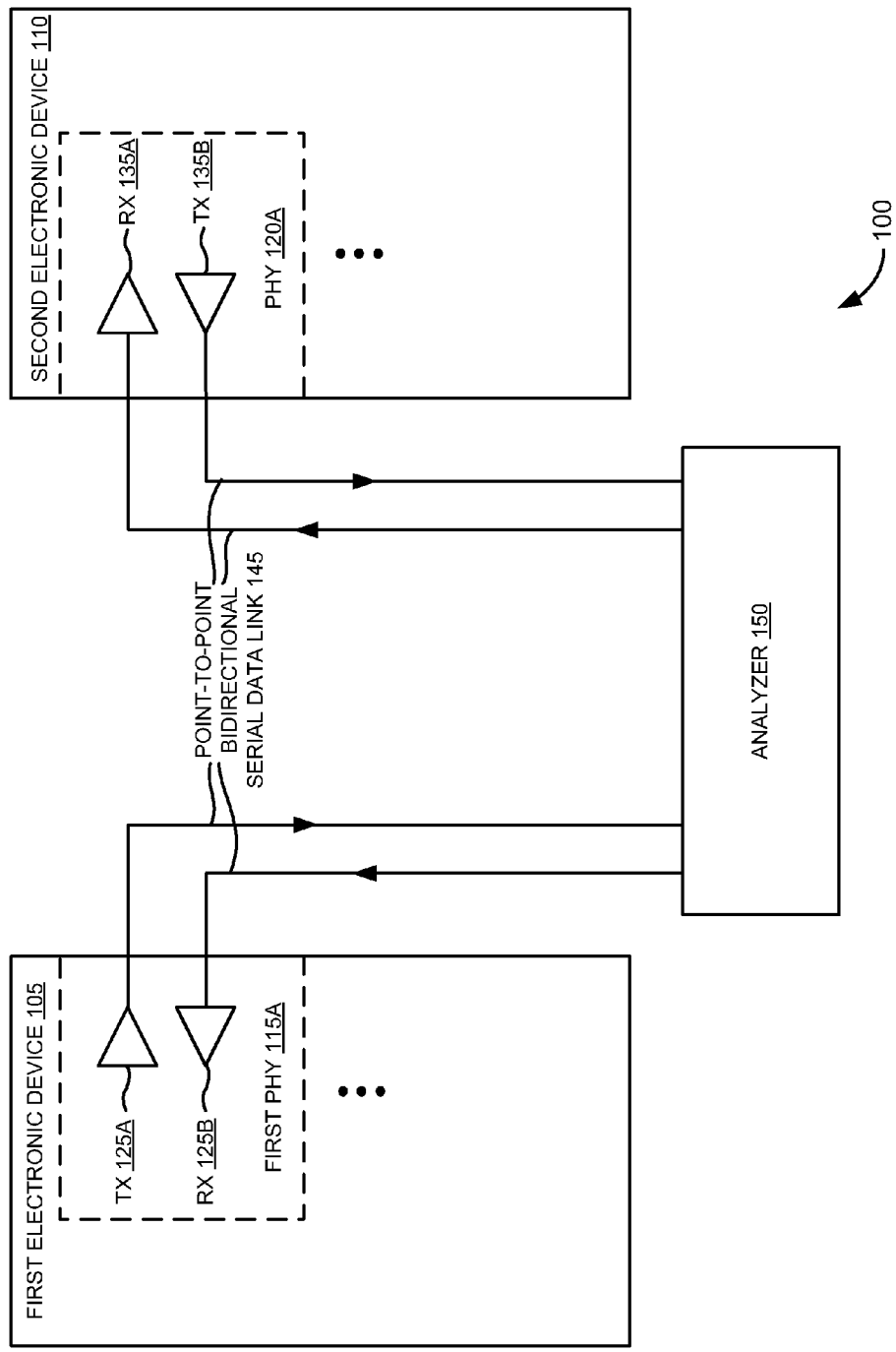
FIG. 1 illustrates use of an analyzer and its connectivity between the point-to-point bidirectional serial data link.

FIG. 1 illustrates use of an analyzer 150 and its connectivity between the point-to-point bidirectional serial data link 145. Particularly, FIG. 1 illustrates the analyzer 150 connected to a first electronic device 105 and a second electronic device 110 via the point-to-point bidirectional serial data links 145. In this embodiment, the analyzer 150 is connected between the first electronic device 105 and the second electronic device 110 by breaking the point-to-point bidirectional serial data link 145. Exemplary point-to-point bidirectional serial data link 145 includes copper cable, optical fiber cable and the like. Exemplary first electronic device 105 and the second electronic device 110 include an end point in a communication network, an electronic device in an embedded circuit, a peripheral component interconnect express (PCIe), a serial attached small computer system interface (SAS) device, a serial advanced technology attachment (SATA) device and the like.

In one embodiment, the first electronic device 105 and the second electronic device 110 includes one or more PHYS. In this embodiment, the first electronic device 105 includes a first PHY 115A. In addition, the first PHY 115A includes a transmitter (TX) 125A and a receiver (RX) 125B. Further in this embodiment, the second electronic device 110 includes a PHY 120A. Furthermore, the PHY 120A includes a transmitter (TX) 135B and a receiver (RX) 135A.

In operation, data is transmitted and received serially between the first electronic device 105 and the second electronic device 110 via the analyzer 150. In one embodiment, the analyzer 150 analyzes and debugs the protocol issues in the data exchanged in the point-to-point bidirectional serial data link 145. In an example embodiment, the data is transferred from the TX 125A in the first electronic device 105 to the analyzer 150. Further in this embodiment, the analyzer 150 analyses the transferred data and further transfers the analyzed data to the second electronic device 110. Furthermore in this embodiment, the data is received by the RX 135A in the second electronic device 110.

Similarly, in this embodiment, the data from the TX 135B in the second electronic device 110 is transferred to the analyzer 150. Further, the analyzer 150 analyses the data and transfers the analyzed data to the first electronic device 105. Furthermore, the data is received by the RX 125B in the first electronic device 105.

Figure 2:
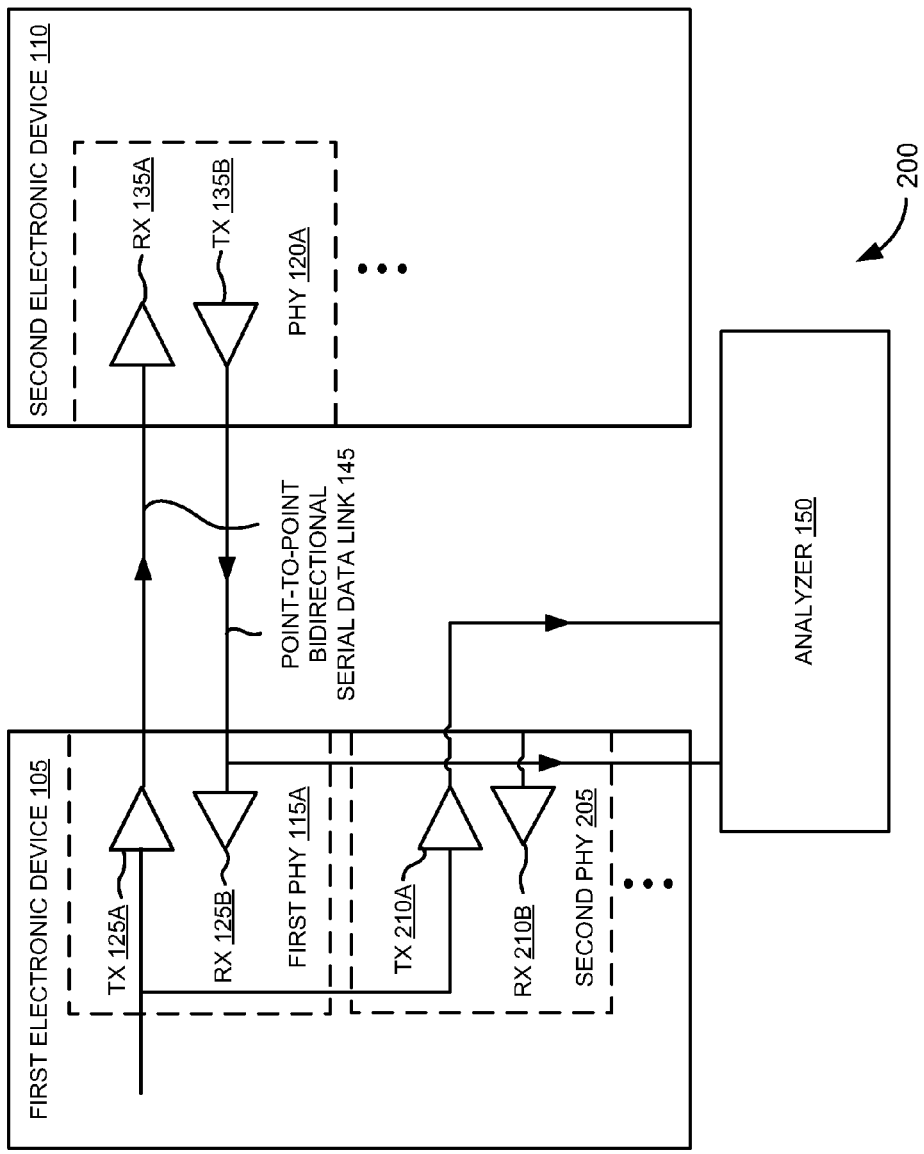
FIG. 2 is a schematic view of obtaining the bidirectional data and analyzing, according to one embodiment.

FIG. 2 is a schematic view of obtaining the bidirectional data and analyzing, according to one embodiment. Particularly, FIG. 2 illustrates the analyzer 150 analyzing the bidirectional data exchanged between the first electronic device 105 and the second electronic device 110 without breaking the point-to-point bidirectional serial data link 145. In one embodiment, the first electronic device 105 includes a second PHY 205 that further includes a TX 210A and a RX 210B. The second PHY 205 can include a new PHY in the first electronic device 105 or an existing PHY in the first electronic device 105.

In this embodiment, the second PHY 205 taps the received and transmitted data at the first electronic device 105. In an example embodiment, the bidirectional data received and transmitted between the first electronic device 105 and the second electronic device 110 includes a serial data link. Further in this embodiment, the tapped received and transmitted data is output to the analyzer 150. Furthermore in this embodiment, the analyzer 150 analyzes the received and transmitted data output by the second PHY 205. In addition in this embodiment, the received data is tapped substantially before the received data is processed in the first electronic device 105. Also, the transmitted data is tapped substantially before the transmitted data is processed by the second electronic device 110.

In one embodiment, the second electronic device 110 sends data to the first PHY 115A. Further, the second PHY 205 taps the data substantially before the data is processed by the first electronic device 105. Furthermore, the second PHY 205 outputs the tapped data to the analyzer 150 for analyzing. In another embodiment, the data transmitted from the first electronic device 105 to the second electronic device 110 is tapped by the second PHY 205 substantially before the data is processed by the second electronic device 110. Further in this embodiment, the second PHY 205 outputs the tapped data to the analyzer 150 for analyzing. The analyzer 150 analyses the received and the transmitted data for a link level protocol analysis to debug and diagnose protocol problems.

Figure 3:
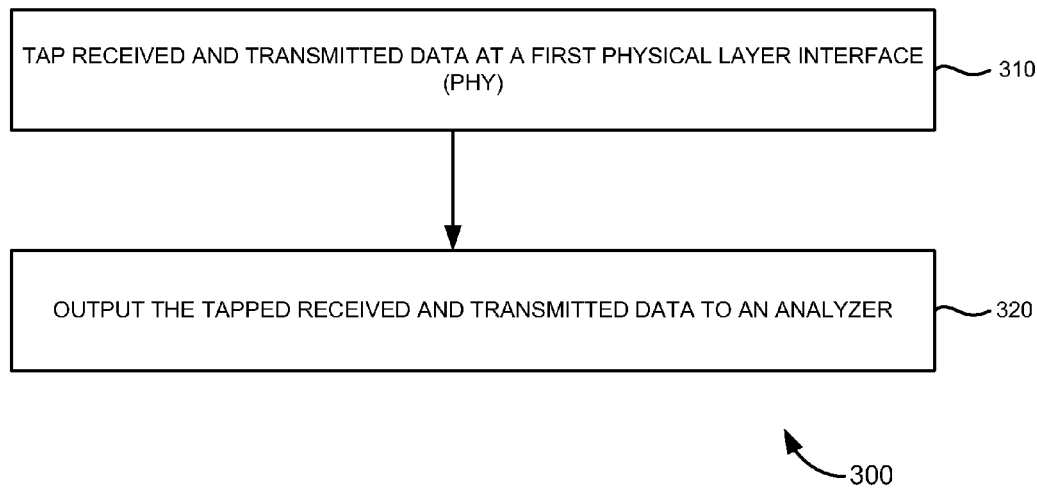
FIG. 3 illustrates a method for analyzing bidirectional data exchanged between electronic devices, according to one embodiment.

FIG. 3 illustrates a method 300 for analyzing bidirectional data between electronic devices, according to one embodiment. In block 310, the received and transmitted data at the first PHY is tapped by the second PHY in the first electronic device. Further, the data is tapped substantially before the received data is processed in the first electronic device and substantially before the transmitted data is processed by the second electronic device.

In one embodiment, the data sent by the second electronic device is received at a first PHY located in the first electronic device. Further in this embodiment, the received data at the first PHY is tapped by the second PHY located in the first electronic device substantially before the data is processed by the first electronic device. Furthermore in this embodiment, the tapped received data is output to the analyzer, by the second PHY, for analyzing the received data. In addition in this embodiment, the data transmitted from the first electronic device to the second electronic device is tapped by the second PHY substantially before the data transmitted by the first electronic device is processed by the second electronic device. Moreover in this embodiment, the tapped transmitted data is output to the analyzer, by the second PHY, for analyzing the transmitted data.

In one embodiment, the second PHY in the first electronic device includes a new PHY in the first electronic device or an existing PHY in the first electronic device. Further in this embodiment, the first electronic device and the second electronic device can include a PCIe, a SAS device and a SATA device. Furthermore in this embodiment, each of the first PHY and the second PHY includes a transmit unit and a receive unit.

In block 320, the tapped received and transmitted data is output to the analyzer for analyzing the received and transmitted data by the second PHY in the first electronic device. Further in this embodiment, the analyzer performs a link level protocol analysis to debug and diagnose protocol problems in the received and the transmitted data. Furthermore in this embodiment, the bidirectional data received and transmitted between the first electronic device and the second electronic device includes a serial data link.

In various embodiments, the apparatus and methods described in FIGS. 1 through 3 enables to connect the analyzer between the first electronic device and the second electronic device without breaking the point-to-point bidirectional serial data link. Further, the systems and methods described in FIGS. 1 through 3 may use any unused ports in the electronic device to transmit the data to the analyzer. Furthermore, the data received at the analyzer need not be sent back to either of the electronic devices and hence can result in a lowered cost for analyzing data exchanged between the electronic devices.

Although the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for analyzing bidirectional data exchanged between electronic devices, comprising:
    tapping received and transmitted data at a first physical layer interface (PHY) by a second PHY in a first electronic device substantially before the received data is processed in the first electronic device and substantially before the transmitted data is processed by a second electronic device, wherein the first electronic device and the second electronic device are end points in a communication network and exchanges the data via a bidirectional serial data link, and wherein the first electronic device comprises a peripheral component interconnect express (PCIe); and
    outputting the tapped received and transmitted data to an analyzer for analyzing the received and transmitted data by the second PHY in the first electronic device without breaking the bidirectional serial data link.

2. The method of claim 1, wherein tapping the received and transmitted data at the first PHY by the second PHY in the first electronic device comprises:
    receiving data sent by the second electronic device at the first PHY located in the first electronic device;
    tapping the received data at the first PHY by the second PHY located in the first electronic, device substantially before the data is processed by the first electronic device;
    outputting the tapped received data to the analyzer for analyzing the received data by the second PHY;
    tapping the transmitted data from the first electronic device to the second electronic device by the second PHY substantially before the transmitted data by the first electronic device is processed by the second electronic device; and
    outputting the tapped transmitted data to the analyzer for analyzing the transmitted data by the second PHY.

3. The method of claim 1, wherein the second PHY in the first electronic device is selected from the army consisting of a new PHY in the first electronic device or an existing PHY in the first electronic device.

4. The method of claim 1, wherein the analyzer, in analyzing the received and the transmitted data, performs a link level protocol analysis to debug and diagnose protocol problems.

5. The method of claim 1, wherein each of the first PHY and the second PHY comprises a transmit unit and a receive unit.

6. The method of claim 1, wherein the second electronic device is selected from the group consisting of a peripheral component interconnect express (PCIe), a serial attached small computer system interface (SAS) device and a serial advanced technology attachment (SATA) device.

7. The method of claim 1, wherein the bidirectional data received and transmitted between the first electronic device and the second electronic device comprises the bidirectional serial data link.

8. An apparatus for analyzing bidirectional data exchanged between electronic devices, comprising:
    a first electronic device including a first physical layer interface (PHY) and a second PHY;
    a second electronic device coupled to the first electronic device via a bidirectional serial data link to the first PHY, wherein the first electronic device and the second electronic device are end points in a communication network and exchanges the data via the bidirectional serial data link, wherein the first electronic device comprises a peripheral component interconnect express (PCIe), wherein the second PHY taps received and transmitted data at the first PHY substantially before the received data is processed in the first electronic device and substantially before the transmitted data is processed by the second electronic device, and wherein the second PHY outputs the tapped received and transmitted data to an analyzer for analyzing the received and transmitted data without breaking the bidirectional serial data link.

9. The apparatus of claim 8, wherein the first PHY receives the data sent by the second electronic device, wherein the second PHY taps the received data at the first PHY substantially before the data is processed by the first electronic device, wherein the second PHY outputs the tapped received data to the analyzer for analyzing the received data, wherein the second PHY taps the transmitted data from the first electronic device to the second electronic device substantially before the transmitted data by the first electronic device is processed by the second electronic device, and wherein the second PHY outputs the tapped transmitted data to the analyzer for analyzing the transmitted data.

10. The apparatus of claim 8, wherein the second PHY in the first electronic device is selected from the group consisting of a new PHY in the first electronic device or an existing PHY it the first electronic device.

11. The apparatus of claim 8, wherein the analyzer analyzes the received and the transmitted data for a link level protocol analysis to debug and diagnose protocol problems.

12. The apparatus of claim 8, wherein each of the first PHY and the second PHY comprises a transmit unit and a receive unit.

13. The apparatus of claim 8, wherein the second electronic device is selected from the group consisting of a PCIe, a SAS device and a SATA device.

14. The apparatus of claim 8, wherein the bidirectional data received and transmitted between the first electronic device and the second electronic, device comprises the bidirectional serial data link.

* * * * *